US008615660B1

United States Patent
Selman et al.

(10) Patent No.: US 8,615,660 B1
(45) Date of Patent: *Dec. 24, 2013

(54) CLOUD COMPUTING SYSTEM FOR REAL-TIME STREAMING OF WELL LOGGING DATA WITH SELF-ALIGNING SATELLITES

(71) Applicants: Thomas H. Selman, Midland, TX (US); Matthew J. Jennings, Midland, TX (US)

(72) Inventors: Thomas H. Selman, Midland, TX (US); Matthew J. Jennings, Midland, TX (US)

(73) Assignee: Selman and Associates, Ltd., Midland, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/624,636

(22) Filed: Sep. 21, 2012

Related U.S. Application Data

(63) Continuation-in-part of application No. 13/356,519, filed on Jan. 23, 2012.

(60) Provisional application No. 61/436,924, filed on Jan. 27, 2011.

(51) Int. Cl.
*H04L 29/06* (2006.01)

(52) U.S. Cl.
USPC ............ 713/175; 380/270; 702/1; 702/2; 702/6; 702/9; 340/853.2; 703/10

(58) Field of Classification Search
USPC ............ 380/270; 702/1, 2, 6, 9; 340/853.2; 703/10; 713/175
See application file for complete search history.

(56) References Cited

U.S. PATENT DOCUMENTS

| | | | | |
|---|---|---|---|---|
| 6,666,099 | B2 * | 12/2003 | Taylor | 73/863.12 |
| 6,701,363 | B1 * | 3/2004 | Chiu et al. | 709/224 |
| 7,099,003 | B2 * | 8/2006 | Saptari et al. | 356/319 |
| 7,339,891 | B2 * | 3/2008 | Binder et al. | 370/231 |
| 7,735,935 | B2 * | 6/2010 | Vinegar et al. | 299/5 |
| 8,145,462 | B2 * | 3/2012 | Foucault | 703/10 |
| 8,204,717 | B2 | 6/2012 | McLaughlin et al. | |
| 2009/0090555 | A1 * | 4/2009 | Boone et al. | 175/45 |
| 2010/0089120 | A1 * | 4/2010 | Hanson | 73/19.02 |
| 2011/0264372 | A1 * | 10/2011 | Ma et al. | 702/6 |
| 2011/0272144 | A1 * | 11/2011 | Belcher et al. | 166/250.01 |
| 2011/0308391 | A1 * | 12/2011 | DeGreeve et al. | 95/260 |
| 2012/0004851 | A1 * | 1/2012 | Potyrailo et al. | 702/19 |
| 2012/0101749 | A1 * | 4/2012 | Garrett et al. | 702/58 |

* cited by examiner

*Primary Examiner* — Kambiz Zand
*Assistant Examiner* — Tongoc Tran
(74) *Attorney, Agent, or Firm* — Buskop Law Group, PC; Wendy Buskop

(57) ABSTRACT

A cloud computing system for real-time streaming of drilling data from a drilling rig using satellites, wherein the system includes client devices for transmitting the drilling data. Radio boxes disposed around the drilling rig to form a local area network for connecting with the client devices. A router and switch connected to the local area network for receiving and transmitting the drilling data. A processor and data storage configured to receive the drilling data and form well logging data for transmission to the router and switch. A modem in communication with the router and switch used to send the drilling data to satellite dishes. A server positioned apart from the drilling rig used to receive drilling data and from well logs and executive dashboards. The server can stream the drilling data, well logs, and executive dashboard in real-time to remote client devices.

18 Claims, 6 Drawing Sheets

FIGURE 2

22 — WITS DATA STORAGE

24 — COMPUTER INSTRUCTIONS TO RECEIVE, STORE, AND SEND THE DRILLING DATA AND THE ASSOCIATED WELL LOGGING DATA

26 — COMPUTER INSTRUCTIONS TO STORE CONFIGURATIONS AND SETTINGS FOR THE PLURALITY OF RIG BASED CLIENT DEVICES, THE RIG BASED WITS PROCESSOR, THE RIG BASED ROUTER AND SWITCH, OR COMBINATIONS THEREOF

27 — COMPUTER INSTRUCTIONS TO PERFORM DIAGNOSTICS ON THE PLURALITY OF RIG BASED CLIENT DEVICES USING DIAGNOSTIC TOOLS

28 — COMPUTER INSTRUCTIONS TO ONLINE CONFIGURE AND RECONFIGURE THE RIG BASED WITS PROCESSOR, THE RIG BASED ROUTER AND SWITCH, THE RIG BASED CLIENT DEVICES, OR COMBINATIONS THEREOF, WHILE THE RIG BASED WIRELESS LOCAL AREA NETWORK IS OPERATING, WITHOUT SHUTTING DOWN THE RIG BASED WIRELESS LOCAL AREA NETWORK

30 — COMPUTER INSTRUCTIONS TO PERFORM DIAGNOSTICS ON THE RIG BASED WIRELESS LOCAL AREA NETWORK

FIGURE 6

5910 - UNIVERSITY 4-29C #1
LAST UPDATED: 01/19/2011 4:52:31 PM
OFF BOTTOM

| HOLE DEPTH | BIT DEPTH | LAG DEPTH | TOTAL GAS | METHANE |
|---|---|---|---|---|
| 7906.73 | 7905.51 | 7878.00 | 28.15 | 7906.73 |
| FT | FT | FT | UNITS | UNITS |
| ETHANE | PROPANE | ISO-BUTANE | NOR-BUTANE | DR |
| 83.26 | 118.33 | 5.43 | 54.63 | 1.05 |
| UNITS | UNITS | UNITS | UNITS | MIN/FT |
| ROP | WOB | HOOK LOAD | BLOCK POS | PUMP PRES |
| 57.38 | 0.07 | 162.55 | 21.23 | 1009.30 |
| FT/HR | klbs | klbs | FT | PSI |
| PUMP 1 | PUMP 2 | PUMP 3 | LAG STKS | TORQUE |
| 0 | 65 | 0 | 2737 | 0.00 |
| STK/MIN | STK/MIN | STK/MIN | - | KFT LBS |
| ROTARY | CC UNITS | TC UNITS | CARRIER PRES | SEL TOTAL STK |
| 65 | 28.15 | -22.86 | 6.13 | 498785.95 |
| RPM | UNITS | UNITS | PSI | STK |
| SEL LAG STK | TOTAL GAS | ROP-AVG | CASNG PRES | METHANE-RT |
| 496049.34 | 28.15 | 0.00 | 0.00 | 10 |
| STK | UNITS | FT/HR | PSI | UNITS |
| ETHANE-RT | PROPANE-RT | ISO-BUTANE-RT | NOR-BUTANE-RT | VENDOR1 |
| 4 | 6 | 0 | 2 | 0 |
| UNITS | UNITS | UNITS | UNITS | - |
| SEL HOLE DEPTH | IR TG UNITS | IR CO2 % | TG TEMPERATURE | GC TEMPERATURE |
| 7906.70 | -62445.63 | -112.75 | 0.00 | 0.00 |
| FT | UNITS | % | DEG F | DEG F |
| TG FLOW RATE | GC FLOW RATE | FUEL LEVEL | | |
| 1.90 | 1.90 | 0.00 | | |
| SCFH | SCFH | GAL | | |

CLOUD COMPUTING SYSTEM FOR REAL-TIME STREAMING OF WELL LOGGING DATA WITH SELF-ALIGNING SATELLITES

CROSS REFERENCE TO RELATED APPLICATIONS

The present application is a Continuation-in-Part of co-pending U.S. patent application Ser. No. 13/356,519 filed on Jan. 23, 2012, entitled "SYSTEM FOR REAL-TIME STREAMING OF WELL LOGGING DATA WITH SELF-ALIGNING SATELLITES," which claims priority to and the benefit of U.S. Provisional Patent Application Ser. No. 61/436,924 filed on Jan. 27, 2011, entitled "SYSTEM FOR REAL-TIME STREAMING OF WELL LOGGING DATA WITH SELF-ALIGNING SATELLITES." These references are hereby incorporated in their entirety.

FIELD

The present embodiments generally relate to a cloud computing system for real-time streaming of well logging data with self-aligning satellites.

BACKGROUND

A need exists for a cloud computing based self-adjusting and online configurable satellite communication system for the transmission of drilling data.

A need exists for a cloud computing system for continuously receiving drilling data from on-rig client devices and monitors, processing the drilling data at the drilling rig into well logging data, and transmitting the well logging data back to on-rig client devices, while simultaneously transmitting the well logging data to a satellite network for transmission to a cloud computing server and to remote client devices.

A need exists for a cloud computing system with a cloud computing server that can provide a secure connection with encrypted drilling data and well logs to client devices that are not located on the rig; allowing for fast safety decisions, quickly implemented changes in drilling direction, and the prevention of rigs from catching fire, exploding, or causing environmental damage.

A need exists for a cloud computing system for transmitting drilling data to on-rig and remote client devices quickly and efficiently, allowing for operators and remote executives to know a status of the drilling operation in real-time with streaming data, thereby allowing for fast and efficient decision making regarding the drilling operations.

The present embodiments meet these needs.

BRIEF DESCRIPTION OF THE DRAWINGS

The detailed description will be better understood in conjunction with the accompanying drawings as follows:

FIG. 2 depicts an embodiment of a WITS data storage.
FIG. 6 depicts an embodiment of a well log.

Figure 1:
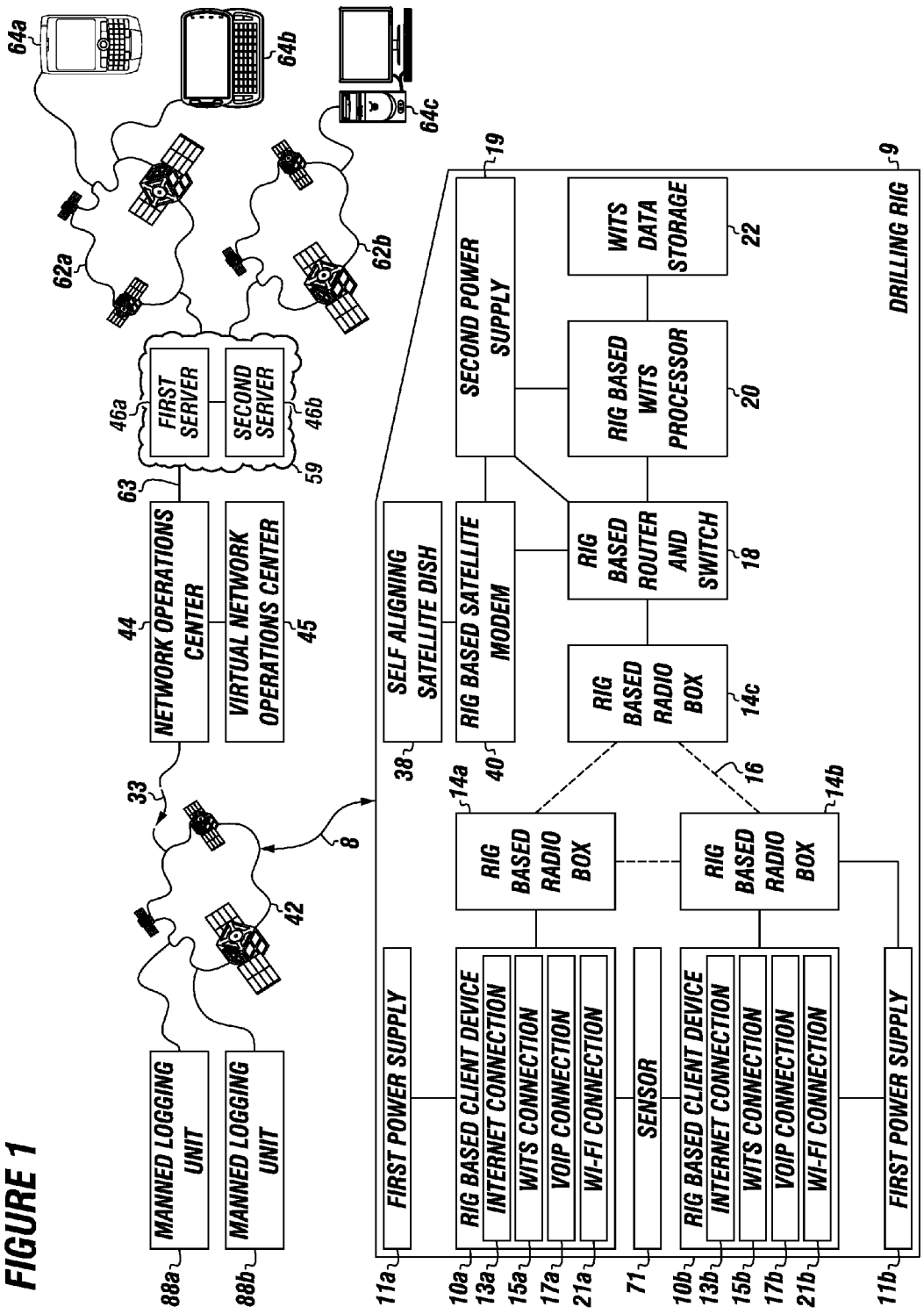
FIG. 1 depicts an overview of an embodiment of the cloud computing system according to an embodiment of the invention.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments relate to a cloud computing system to provide continuous real-time streaming of drilling data and well logging data from a drilling rig, such as an oil or gas drilling rig.

The cloud computing system can provide a unique way to collect, compile, and transmit drilling data to on-rig and remote client devices, providing a single cloud computing server for access of the drilling data by operators and other users. The cloud computing system can be used to provide a single access point for drilling data acquired from multiple electronic drilling recorder providers, mud logging providers, and other third party providers from multiple drilling rigs and/or locations using the cloud computing server.

The cloud computing system can provide WI-FI™, Voice over Internet Protocol (VoIP) telephone communications, and Internet access from a plurality of rig based client devices on the drilling rig. For example, the cloud computing system can use a local area network of radio devices that can be in communication with self-aligning satellite dishes and a satellite network.

The satellite network can provide a secure communication with a computing cloud containing a cloud computing server for secure communication to non-rig based remote client devices.

The cloud computing system can be used to receive drilling data and well logging data from rig based client devices and to transmit the drilling data to rig based client devices and remote client devices in a continuous real-time stream. Real-time can mean acquisition of data and transmission of the acquired data, wherein the transmitted acquired data is received by an intended target with minimal delay. Minimal delay can be from about 1 millisecond to about 20 minutes. The intended target can be a remote network, a device in communication with the transmitting device, or the like.

The phrase "WITS" as used herein stands for "well site information transfer specification," which can be a communications format used for the transfer of a wide variety of well site data from one computer cloud computing system to another.

The cloud computing system can include a rig based WITS processor that can be in communication with a WITS data storage and a power supply, such as a second power supply.

The rig based WITS processor can be configured to receive the drilling data from the plurality of rig based client devices and form well logging data for transmission to rig based client devices and remote client devices through a rig based router and switch.

The cloud computing system communicates from a computer cloud to the rig based WITS processor and the WITS data storage.

The communication can be a multi-level format and can be used to achieve entry point with higher levels. At lower levels, a fixed format ASCII data stream can be used. At higher levels, a self-defining customizable data stream can be used. A WITS data stream can include discrete data records, each of which can be generated independently of other data record types, and can have a trigger variable and sampling interval.

The cloud computing system can include cloud based cloud processors and cloud data storage with computer instructions in the cloud data storage that is adapted to send instructions to set or change certain parameters, including the type of data transmitted and the interval for transmission. The computing cloud can use computer instructions in the cloud data storage to instruct the cloud processors to specify a format for data transmission and define a basic set of predefined records to which user-defined record types can be added.

A computing cloud, as the term is used herein, refers to one or more cloud data storage units and one or more cloud based processing units wherein the computing cloud is configured to provide at least one service and shared hardware and software resources.

A plurality of client devices connect to the computing cloud. The client devices can be servers, computers, laptops, cell phones, and other types of processing equipment with cloud data storage that have inputs and outputs to connect to a network that communicates with the computing cloud.

The rig based WITS processor can be used with the local area network and rig based client devices to do on-the-spot compiling of the drilling data and well logging data, as well as to provide alarms to operators on the drilling rig via continuous executive dashboards for operators and/or executives.

The cloud computing system can use computer instructions in the computing cloud data storage to provide alarms to executives of a drilling company using continuous remote executive dashboards via the self-aligning satellite dishes, satellite network, and encrypted communications with a network operations center and a cloud computing server.

The cloud computing system can provide various benefits including safety benefits, operational benefits, geological benefits, and cost benefits.

The safety benefits of this system can include detecting hydrocarbons and other gases to prevent the occurrence of explosions, blowouts, poisoning, and other dangerous situations.

Operational benefits of this system can include allowing executives at remote locations to view real-time streaming data, enabling the executives to make timely decisions based on the real-time streaming data.

The geological benefits of this cloud based system are those of a reduced cost in locating hydrocarbon and gas reservoirs, as well as other geological benefits.

The cloud computing system can include self-aligning satellites in communication with the rig based WITS processor for transmitting and receiving the drilling data and associated well logging data.

In one or more embodiment, the rig based client devices can receive drilling data from sensors; monitoring devices; or other measurement instruments, such as chromatographs, mud pumps, mud volume totalizers, mud pit volume totalizers, mud pit monitors, drill switches, gas sensors, depth sensors, on-off bottom switches, flame ionization detectors, catalytic combustion detectors, thermal conductivity detectors, infrared gas detectors, other gas detection devices, other gas measuring devices, weight on bit transducers, drilling rig servers, the like, or combinations thereof.

Examples of the drilling data, including the associated well logging data, that can be transmitted and received include: hole depth; drill bit depth; lag depth; total gas; methane content; ethane content; propane content; isobutane content; pump pressure; torque; carrier air pressure; casing pressure; fluorescence; drilling mud content; well bore depths; chromatograms; lag time information; rate of penetration into the wellbore; weight on the drill bit; hook load; stand pipe pressure; pump stroke rate; rotary table speed; mud tank levels; measured depth of the wellbore; true vertical depth of the wellbore; measured depth of the drill bit; true vertical depth of the drill bit; measured depth at which the drilling data is received, such as a depth of a geological or gas sample, gamma ray reading data, resistivity readings, caliber readings, temperature readings, or any other data measured during the drilling of a wellbore; and other related drilling information.

Each rig based client device can be connected to, or otherwise in communication with, a power supply, such as an on-rig power supply. The power supply can be batteries or another type of on-rig power source.

The rig based client devices can be a client indoor unit (CIDU) made by Selman and Associates, Ltd. of Midland, Tex., or other rig based client devices configured to receive and transmit the drilling data from the sensors, monitoring devices, or other measurement instruments using one or more communication pathways. For example, each rig based client device can have an Internet connection, a WITS connection, a Voice over Internet Protocol phone connection (VoIP), and a WI-FI™ connection for communication of the drilling data and the associated well logging data. The WITS connection can be a port for receiving the drilling data and transferring the drilling data to the rig based WITS processor.

Each rig based client device can be adapted to connect to the computing cloud to receive and transmit the drilling data and the associated well logging data, send and receive phone calls, send and receive queries over the Internet, send and receive communications using the WI-FI™ connection, or combinations thereof. For example, the phone calls can be used to allow a rig manager or operator to call headquarters to update personnel and executives on a status of drilling operations, to call for help in emergency situations, to request supplies, or the like.

Providing for phone calls can be useful because many drilling rigs are disposed at remote locations where there is otherwise no phone service. For example, the Internet can be used by the rig manager, operator, or a drilling supervisor to send and receive reports, emails, and to access remote databases, such as company databases, via the Internet connection. For example, the WI-FI™ connection can be by the rig manager, operator, or drilling supervisor to send and receive reports, emails, and to access remote databases, such as company databases, using WI-FI™ enabled portable devices, such as mobile phones, laptops, netbooks, and the like.

A plurality of rig based radio boxes, such as those made by Engenius Technologies of Costa Mesa, Calif., model number EOC5610, can be attached to the drilling rig and connected to the computing cloud. When activated, each rig based radio box can form a rig based local area network for connecting to and communicating with each rig based client device. Each rig based radio box can have a bidirectional antenna, a receiver, and a transmitter for receiving and transmitting signals. The rig based local area network can be a wireless network, a wired network, or combinations thereof.

A rig based router and switch can be connected to, or otherwise in communication with, the rig based local area network, a second power supply, and the computing cloud.

An illustrative rig based router and switch can include one made by D-Link of Fountain Valley, Calif. The second power supply can be a rig power supply, such as a generator or a bank of batteries.

The rig based router and switch can be configured to receive and transmit signals using the rig based local area network. For example, the rig based router and switch can transmit signals from the rig based local area network to both the rig based WITS processor and one or more self-aligning satellite dishes. An illustrative self-aligning satellite dish can include a General Dynamics Sentinel Cloud computing system, Model 2985-140. The satellite network can include equipment made by HughesNet in combination with satellites in orbit.

In operation, the rig based WITS processor can receive the drilling data from the rig based client devices. The rig based WITS processor can then perform compilation of the received drilling data, can track changes of the received drilling data, and can connect to the computing cloud; enabling use of computer instructions in the computing cloud data storage to further process the data. For example, compilation of the drilling data can include collecting the various distinct drilling data points, as well as storing the drilling data. An example of the tracking of the changes to the drilling data can include determining the presence of a change in a data point. For example, if a measured drill bit depth is first measured at 2545.3 feet, and then the measured drill bit depth is measured at 2545.8 feet, the rig based WITS processor can determine the presence of a change in that data point. The rig based WITS processor can be configured to transmit the data point to rig based client devices and remote client devices only when the presence of a change is determined.

The rig based WITS processor can form well logging data for transmission to the rig based client devices and to the remote client devices after analysis using computer instructions in the computing cloud, forming compiled drilling data. For example, the formation of the well logging data can include forming a table of the compiled drilling data. The drilling data on the table of the compiled drilling data can be simultaneously indexed by measured hole depth, date stamp, and time stamp.

The rig based WITS processor can transmit well logging data and drilling data directly to the self-aligning satellite dish that is in communication with a satellite network and the computing cloud through the rig based router and switch.

The WITS data storage can include various computer programs and computer instructions.

The WITS data storage can include computer instructions to receive, store, and send the drilling data and the associated well logging data. For example, the WITS data storage can receive the drilling data and the associated well logging data from the rig based client devices. The WITS data storage can store drilling data and the associated well logging data therein. The WITS data storage can send the drilling data, the associated well logging data, and other WITS information to remote client devices, such as through the satellite network of the self-aligning satellite dish.

The other WITS information can include weather conditions, sea conditions, operator comments, well identification data, vessel motion and mooring status data, an operator name, a well name, kelly bushing height of the well bore at the surface, an owner name for the well bore, cell phone numbers, other contact information, and other similar information.

The WITS data storage can include computer instructions to store configurations and settings for the plurality of rig based client devices, the rig based WITS processor, the rig based router and switch, or combinations thereof. For example, a configuration of a rig client device can include inputting IP addresses, phone numbers, and serial communications port numbers into the rig based client devices. Configuration of the rig based WITS processor and the rig based router and switch can be similarly performed.

The WITS data storage can contain computer instructions to configure and reconfigure online the rig based processor, the rig based router and switch, and combinations thereof, all while the network is operating without shutting the network down.

The WITS data storage can include computer instructions to perform diagnostics on the plurality of rig based client devices using diagnostic tools. For example, the diagnostic tools can include indicators that can indicate whether or not the rig based client devices are online, indicators of signal quality from the rig based client devices, indicators of ping times, indicators of current IP addresses, indicators of whether or not the rig based client devices capable of transmitting drilling data, and the like.

The WITS data storage can include computer instructions to perform diagnostics on the local area network. For example, the diagnostic tools can include indicators that can indicate whether or not the local area network is online, indicators of signal quality from the local area network, indicators of ping times, indicators of current IP addresses, and the like. The indicators associated with the diagnostic tools can be visual indicators.

The WITS data storage can include computer instructions to store configurations and settings for the plurality of rig based client devices, the rig based WITS processor, the rig based router and switch, or combinations thereof thereon. For example, the configurations and settings can include communication port numbers for the rig based client devices, IP addresses, a number or type of data points that each rig based client device is configured to send and receive, or the like.

The WITS data storage can include computer instructions to online configure and reconfigure the rig based WITS processor, the rig based router and switch, the rig based client devices, or combinations thereof, while the rig based local area network is operating without shutting down the rig based local area network. For example, during operation of the rig based local area network, the rig based WITS processor, the rig based router and switch, and the rig based client devices can be configured as described above and can then further be reconfigured as described above.

A rig based satellite modem can be connected to, or otherwise in communication with, the rig based WITS processor, the rig based router and switch, the second power supply, and the one or more self-aligning satellite dishes, through the satellite network for communication with a computing cloud.

A computing cloud can be formed at a location apart from the rig, such as from about 100 miles to about 2000 miles away from the drilling rig.

The computing cloud can include one or more cloud computing processors and a cloud computing data storage connected to, or otherwise in communication with, the one or more cloud computing processors. A display can be associated or in communication with the cloud computing server. Information and other data from the cloud computing server can be displayed on the display and on displays of one or more remote client devices.

The cloud computing data storage can have various computer instructions stored thereon.

The cloud computing data storage can include computer instructions to receive the well logging data and the drilling data from the rig based WITS processor. The well logging data and the drilling data can be received by the cloud computing server in real-time using data streaming over the satellite network.

The cloud computing data storage can include computer instructions to store the received well logging data and the drilling data therein.

The cloud computing data storage can include computer instructions to display the well logging data and the drilling data using real-time streaming. The well logging data and the drilling data can be displayed on the display of the cloud computing server and on displays of remote client devices.

The cloud computing data storage can include computer instructions to activate an alarm when the drilling data and/or the well logging data exceeds or falls beneath a preset limit. The preset limit can be a user set preset limit that can be input and stored into the cloud computing data storage. For example, a user can set a high threshold limit for the total hydrocarbon reading of a wellbore. If the measured total hydrocarbon reading exceeds the preset limit set by the user, the alarm can be initiated. The alarm can be any auditory alarm, visual alarm, or both. Another example of the alarm can be an alarm that indicates that too much ethane is detected at the well bore.

The cloud computing data storage can have computer instructions to form an executive dashboard of the drilling data and associated well logging data. The executive dashboard can be used by users, such as CEOs, Presidents, public affairs officers, safety officers, operators, executives, and other users at a location remote from the drilling rig to monitor progress and to initiate changes in drilling plans. For example, the user can monitor the drilling data. The user can initiate changes to the drilling plans if the user determines that the drilling data indicates a need for the change. For example, the drilling data might indicate that a change in a direction of the drilling is required, that a change in the drilling fluid is required, that the drilling needs to be stopped, or the like.

The executive dashboard can display all of the drilling data and associated well logging data disclosed therein, the name of the well, a time stamp for the data, a view time for the data, WITS information, weather conditions, sea conditions, operator comments, well identification data, vessel motion and mooring status data, pump speed, pump rate, composition of gasses coming from the wellbore, type of rock in the formation, and the like. The executive dashboard can present the data graphically and digitally.

The cloud computing data storage can have computer instructions to track drilling progress on multiple wells simultaneously. For example, the cloud computing server can use the computer instructions on the cloud computing data storage to track the various drilling data from multiple drilling rigs simultaneously. A user can track the drilling data using the executive dashboard.

The cloud computing data storage can have computer instructions for scaling of drilling data.

An example of scaling of drilling data, with a depth as the y-axis and a data value as the x-axis, can include changing a magnitude of the data value on the x-axis to match a scale to allow at least most of the data values to reside within the scaling for the entirety of the well log. For example, scaling can include fitting drilling data on a graph's x-axis by dividing each value by 100, making a graph that is scaled 0-to-100. Any value less than 100 on the scale will show up in the graph.

In one or more embodiment, if a data value exceeds the maximum point on the scale, the data value can appear on the scale with a visual indicator, indicating that the data value is equivalent to its position on the scale plus the maximum value of the scale. For example, if the maximum on the scale is 100, and the data value is 112, the data value can appear as 12 on the scale with a visual indication that the data value has gone over-scale, thereby indicating that the data value is actually 112.

The cloud computing data storage can have computer instructions for transferring drilling data and well logging data to remote client devices. The remote client devices can be client devices that are not located at the drilling rig.

The cloud computing data storage can have computer instructions to generate a well log using the drilling data. For example, the computer instructions can generate a well log by forming a well log table and by forming a graphical representation of the drilling data. For example, the computer instructions can plot drilling time, plot drilling depth, plot pump pressure, plot torque on the well drilling equipment, plot casing pressure, plot rotary table revolutions per minute, plot mud pit volume, perform mud pit totalizing, display total hydrocarbon readings, display the drilling data, the associated well logging data, or combinations thereof. All of the data and plotted data in the cloud computing data storage can be compiled and presented on the executive dashboard as the well log.

The cloud computing data storage can have computer instructions to perform diagnostics on drilling rig based equipment and drilling rig based software. For example, an administrator can perform the diagnostics. The performance of diagnostics can include the same of the diagnostics of that described above with respect to the rig based WITS processor and WITS data storage, with the ability to configure remotely.

The cloud computing data storage can have computer instructions to reconfigure the drilling rig based equipment and the drilling rig software on-line without taking down or shutting off all or a portion of the rig based local area network. For example, while at least a portion of the rig based local area network is running, the cloud computing server can use the computer instructions thereon to reconfigure the drilling rig based equipment and the drilling rig software by in a manner substantially similar as described above with respect to the rig based WITS processor and WITS data storage, but from a remote location. The drilling rig based equipment can include the rig based client devices, the rig based WITS processor, the rig based radio boxes, the self-aligning satellite dish, the rig based satellite modem, the rig based local area network, the rig based router and switch, and the like. The drilling rig software can be any software that is operating the drilling rig based equipment and is directly or indirectly accessible through the satellite network.

The cloud computing system can include computer instructions to provide an encrypted connection providing a secure connection between the network operation center and the cloud computing server.

The encrypted connection can be formed using encryption software. The encryption software can include symmetric encryption; asymmetric encryption, such as RSA encryption; or combinations thereof. The encryption module can include computer instructions to provide a security certificate verifiable by a trusted third party. For example, an RSA encryption with security certificates verifiable by a trusted third party, such as VERISIGN™, can be used.

The encryption module can be installed in a cloud based data storage to provide an encrypted communication between the cloud based server and to provide secure communication between users with remote client devices and the computing cloud.

In one or more embodiment, the encryption module can include computer instructions to form a secure log-in. For example, the secure log-in can be formed by requiring a user name and password to access the cloud computing server. The encryption module can encrypt any transmission of the required user name and password.

The encryption module can include computer instructions to verify the log-in. For example, the log-in can be verified by comparing a received user name and password with authorized user name and passwords stored in the cloud computing data storage. The encryption module can ensure that the user associated with the user name and password is authorized to access particular data in the cloud computing server, and is authorized to perform particular actions in the cloud computing server.

The encryption module can include computer instructions to encrypt drilling data with a symmetric data encryption algorithm. For example, the drilling data can be encrypted using a key and a cipher algorithm to encrypt and decrypt the drilling data.

At least one remote client device can be connected to, or otherwise in communication with, a network, such as the Internet, a cellular network, or any other communications network. The remote client device can communicate with the cloud computing server. Each remote client device can be a laptop, desktop computer, mobile phone, personal digital assistant, netbook, or the like. Each remote client device can be configured to receive data from the cloud computing server in a real-time stream including: the drilling data, associated well logging data, the well log, and the executive dashboard. For example, the remote client devices can receive and present the data on a web browser. As such, users can remotely view the executive dashboard of the drilling data and the well logging data.

In one or more embodiment, the remote network operations center can be a virtual network operations center that is run from additional servers connected to the network. Also, a virtual network operations center can be used in conjunction with a physical remote network operations center.

In one or more embodiment, the network can be a combination of at least two networks. The network can be a satellite network, the Internet, a cellular network, a fiber optic network, another wired network, a category 5e network, another wireless network, a WI-FI™ network, or combinations thereof.

Each power supply can be a plurality of batteries, a bank of batteries, a wind generator, a solar array, a rig generated power supply, or another power supply.

In one or more embodiment, the cloud computing server can include a plurality of processors, such as from about 2 processors to about 20 processors, that can be connected in parallel or in series to a switch, the cloud computing data storage, and a third power supply.

The plurality of processors can use the central polling drop point to pick up drilling data from other manned logging units, record the drilling data, store the drilling data, and post the drilling data provided from the rig based client devices and the other manned logging units. The central polling drop point can be a folder or directory accessible via a file transfer protocol (FTP) server, a folder or directory that is accessible via a website using various HTTP protocols or instructions, or the like. The other manned logging units can be mobile field laboratories that create hydrocarbon well logs via automatic processes and/or manual analysis. The drilling data can be transmitted to the rig based WITS processor, rig based client devices, the remote client devices, and to a website presented by the cloud computing server. The website can be streamed through the network for presentation on web browsers of the remote client devices. The plurality of processors can increase efficiency, speed, and reliability of the cloud computing system.

In one or more embodiment, the cloud computing server can have client accounts stored therein. The client accounts can include user names, passwords, names, and contact information for each user.

In one or more embodiment, the cloud computing server can have information input therein. The information can include information and data received from the other manned logging units, including information about the wellbores; well header information, such as operator names; location information; well names; and the like.

In one or more embodiment, the cloud computing server can monitor, or can be used to monitor, data traffic to the central polling drop point for the central server processor. For example, monitoring the data traffic to the central polling drop point can include identifying when new files arrive to a folder or directory, and transferring that new data to at least one of the central server processors for storage and filing. Monitoring the data traffic can include compiling the data with existing data in already existing folders or directories.

In one or more embodiment, the cloud computing server can monitor, or be used to monitor, drilling data for use in generating the well log and storing and displaying the drilling data as a real-time stream. The monitoring of the drilling data for use in storing and displaying as real-time streaming drilling data can include determining a presence of a change in the drilling data for real-time streaming of the drilling data.

Turning now to the Figures, FIG. 1 depicts a diagram of the cloud computing system at a drilling rig 9.

Two rig based client devices 10a and 10b can each have an internet connection 13a and 13b, a WITS connection 15a and 15b, a VoIP connection 17a and 17b, and a WI-FI™ connection 21a and 21b. As such, each rig based client device 10a and 10b can have multiple communication channels for receipt and transmission of drilling data 8 and for other communications.

Each rig based client device 10a and 10b can be in communication with first power supplies 11a and 11b for receipt of power therefrom.

Each rig based client device 10a and 10b can be in communication with one of a first rig based radio box 14a and/or a second rig based radio box 14b. At least one of the rig based radio boxes, such as the second rig based radio box 14b, can be connected to one of the first power supplies, such as the first power supply 11b.

A third rig based radio box 14c can be connected to or in communication with one or both of the first and second rig based radio boxes 14a and 14b. The combination of the first, second, and third rig based radio boxes 14a-14c can form a rig based local area network 16.

A rig based router and switch 18 can be in communication with the rig based local area network 16, a rig based satellite modem 40, and a rig based WITS processor 20.

The rig based WITS processor 20 can be in communication with a WITS data storage 22, which can be a flash drive, a hard drive, a disc drive, or another form of data storage.

A second power supply 19 can be connected to the rig based WITS processor 20, the rig based router and switch 18, and the rig based satellite modem 40 for supplying power thereto.

The rig based satellite modem 40 can be in bidirectional communication with a self-aligning satellite dish 38. The self-aligning satellite dish 38 can be in communication with a satellite network 42. The satellite network 42 can be in communication with a first manned logging unit 88a, a second manned logging unit 88b, and a network operations center 44.

The network operations center 44 can be located remote from the drilling rig 9. The network operations center 44 can be in communication with a virtual network operations center 45.

An encrypted connection 63 can provide encrypted communication between the network operations center 44 and a computing cloud 59 containing a first cloud computing server 46a and a second computing cloud server 46b. The cloud computing server 46 can be in communication with a first network 62a and a second network 62b. The first and second networks 62a and 62b can be cellular networks, the Internet, or other networks disclosed herein. Each server 46a or 46b has a processor connected to data storage and communication ports for input and output.

The computing cloud 59 has one or more cloud data storage units and one or more cloud based processing units, wherein the computing cloud is configured to provide at least one service and shared hardware and software resources.

Three remote client devices 64a, 64b, and 64c can be in communication with the first network 62a, the second network 62b, or combinations thereof.

In operation, the rig based client devices 10a and 10b can receive the drilling data 8 from sensors, monitors, measurement devices, and other such instruments used for collecting data on the drilling rig 9, such as from a sensor 71. The rig based client devices 10a-10b can transmit the drilling data 8 to the rig based radio boxes 14a, 14b, and 14c through the rig based local area network 16.

The rig based radio boxes 14a-14c can transmit the drilling data 8 to the rig based router and switch 18 through the rig based local area network 16. The rig based router and switch 18 can transmit the drilling data 8 to the WITS data storage 22, such as by communication with the rig based WITS processor 20. The drilling data 8 can then be stored on the WITS data storage 22.

The rig based WITS processor 20 can use one or more computer instructions in the WITS data storage 22 to form well logging data for transmission to the remote client devices 64a, 64b, and 64c through the rig based router switch 18, the satellite network 42, and the computing cloud 59.

The rig based WITS processor 20 can use one or more computer instructions in the WITS data storage 22 to transmit the drilling data 8 through the rig based router and switch 18 to the rig based satellite modem 40. The rig based satellite modem 40 can transmit the drilling data 8 to the self-aligning satellite dish 38 and through the satellite network 42 to the network operations center 44.

The network operations center 44 can receive the drilling data 8 from the self-aligning satellite dish 38 and other drilling data from the manned logging units 88a and 88b. The network operations center 44 can transmit the received drilling data 8 from the self-aligning satellite dish 38 and other drilling data from the manned logging units 88a and 88b to the cloud computing servers 46a and 46b.

The cloud computing server 46a can receive, compile, and store the received drilling data 8. The cloud computing server 46b can perform various tasks and operations on the drilling data 8 using the various computer instructions stored in data storage which forms part of the cloud computing server or is a data storage apart from a cloud server but connected to one of the computing cloud servers 46a or 46b.

For example, the cloud computing server 46a can form an executive dashboard and a well log of the drilling data 8 for presentation to user. The cloud computing server 46a can transmit the drilling data 8 through the first and second networks 62a and 62b to a plurality of remote client devices, such as the remote client devices 64a, 64b, 64c. As such, remote users can receive real-time streaming drilling data 8 on an executive dashboard from a remote location from the drilling rig 9. The cloud computing server 46a can activate an alarm 33 if the drilling data 8 exceeds or falls below a preset limit.

FIG. 2 depicts an embodiment of the WITS data storage 22.

The WITS data storage 22 can include computer instructions to receive, store, and send the drilling data and the associated well logging data 24.

The WITS data storage 22 can include computer instructions to store configurations and settings for the plurality of rig based client devices, the rig based WITS processor, the rig based router and switch, or combinations thereof 26.

The WITS data storage 22 can include computer instructions to perform diagnostics on the plurality of rig based client devices using diagnostic tools 27.

The WITS data storage 22 can include computer instructions to online configure and reconfigure the rig based WITS processor, the rig based router and switch, the rig based client devices, or combinations thereof, while the rig based wireless local area network is operating, without shutting down the rig based wireless local area network 28.

The WITS data storage 22 can include computer instructions to perform diagnostics on the rig based wireless local area network 30.

Figure 3:
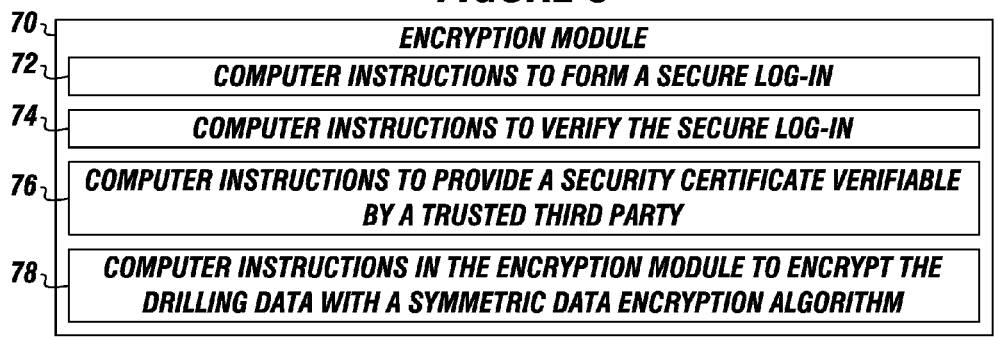
FIG. 3 depicts an embodiment of an encryption module.

FIG. 3 depicts an embodiment of the encryption module 70, which can include computer instructions to form a secure log-in 72, computer instructions to verify the secure log-in 74, computer instructions to provide a security certificate verifiable by a trusted third party 76, and computer instructions in the encryption module to encrypt the drilling data with a symmetric data encryption algorithm 78.

Figure 4:
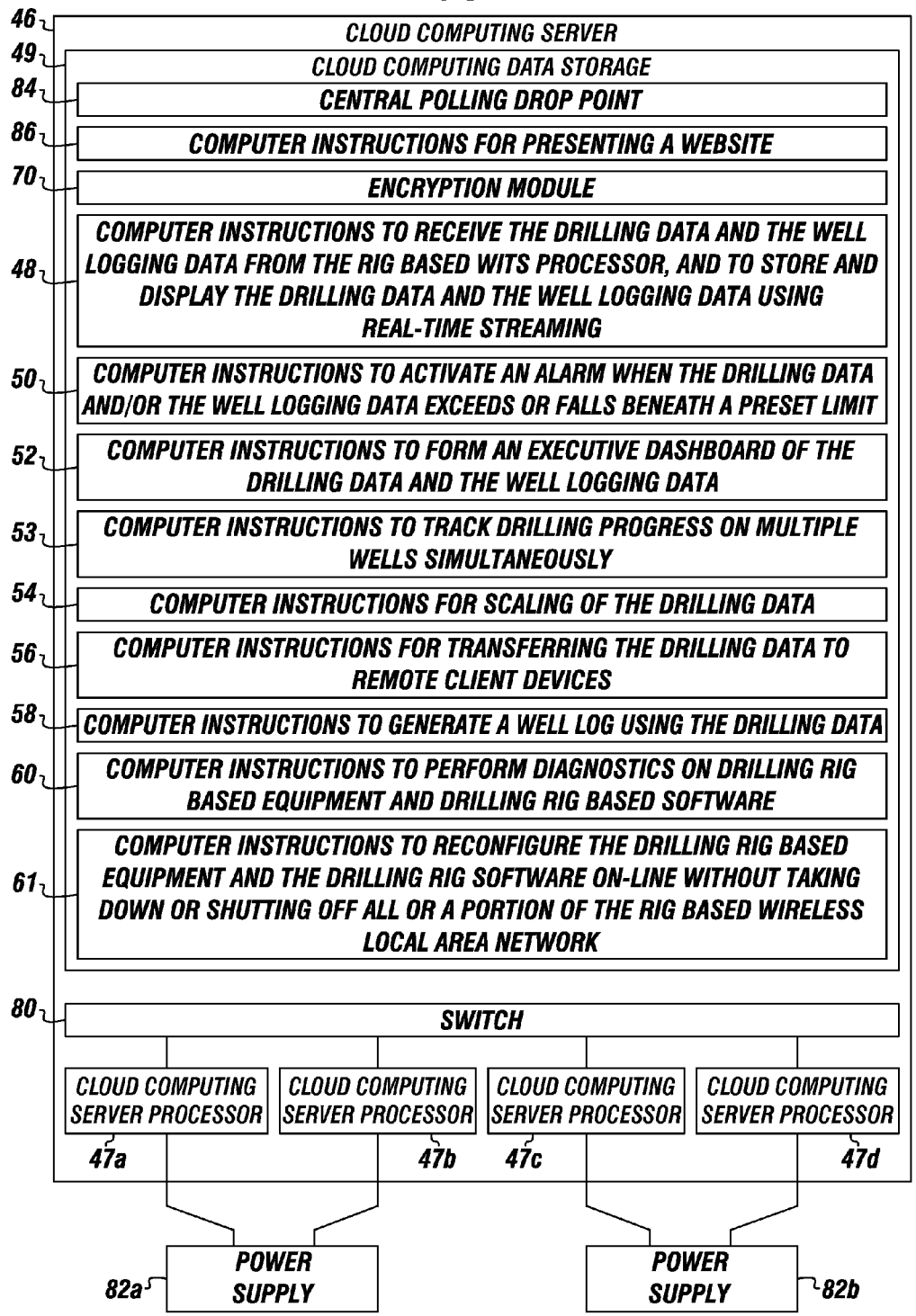
FIG. 4 depicts an embodiment of a cloud computing server.

FIG. 4 depicts an embodiment of a cloud computing server 46. The cloud computing server 46 can include a plurality of cloud computing server processors 47a, 47b, 47c and 47d connected in parallel to a switch 80. The plurality of cloud computing server processors 47a, 47b, 47c and 47d can be connected to two different power supplies 82a and 82b and a plurality of cloud data storage units.

The cloud computing server 46 can include a cloud computing data storage 49 with a central polling drop point 84, computer instructions for presenting a website 86, and the encryption module 70.

The cloud computing data storage 49 can include computer instructions to receive the drilling data and the well logging data from the rig based WITS processor, and to store and display the drilling data and the well logging data using real-time streaming 48.

The cloud computing data storage 49 can include computer instructions to activate an alarm when the drilling data and/or the well logging data exceeds or falls beneath a preset limit 50.

The cloud computing data storage 49 can include computer instructions to form an executive dashboard of the drilling data and the well logging data 52.

The cloud computing data storage 49 can include computer instructions to track drilling progress on multiple wells simultaneously 53.

The cloud computing data storage 49 can include computer instructions for scaling of the drilling data 54.

The cloud computing data storage 49 can include computer instructions for transferring the drilling data to remote client devices 56.

The cloud computing data storage 49 can include computer instructions to generate a well log using the drilling data 58.

The cloud computing data storage 49 can include computer instructions to perform diagnostics on drilling rig based equipment and drilling rig based software 60.

The cloud computing data storage 49 can include computer instructions to reconfigure the drilling rig based equipment and the drilling rig software on-line without taking down or shutting off all or a portion of the rig based wireless local area network 61.

Figure 5:
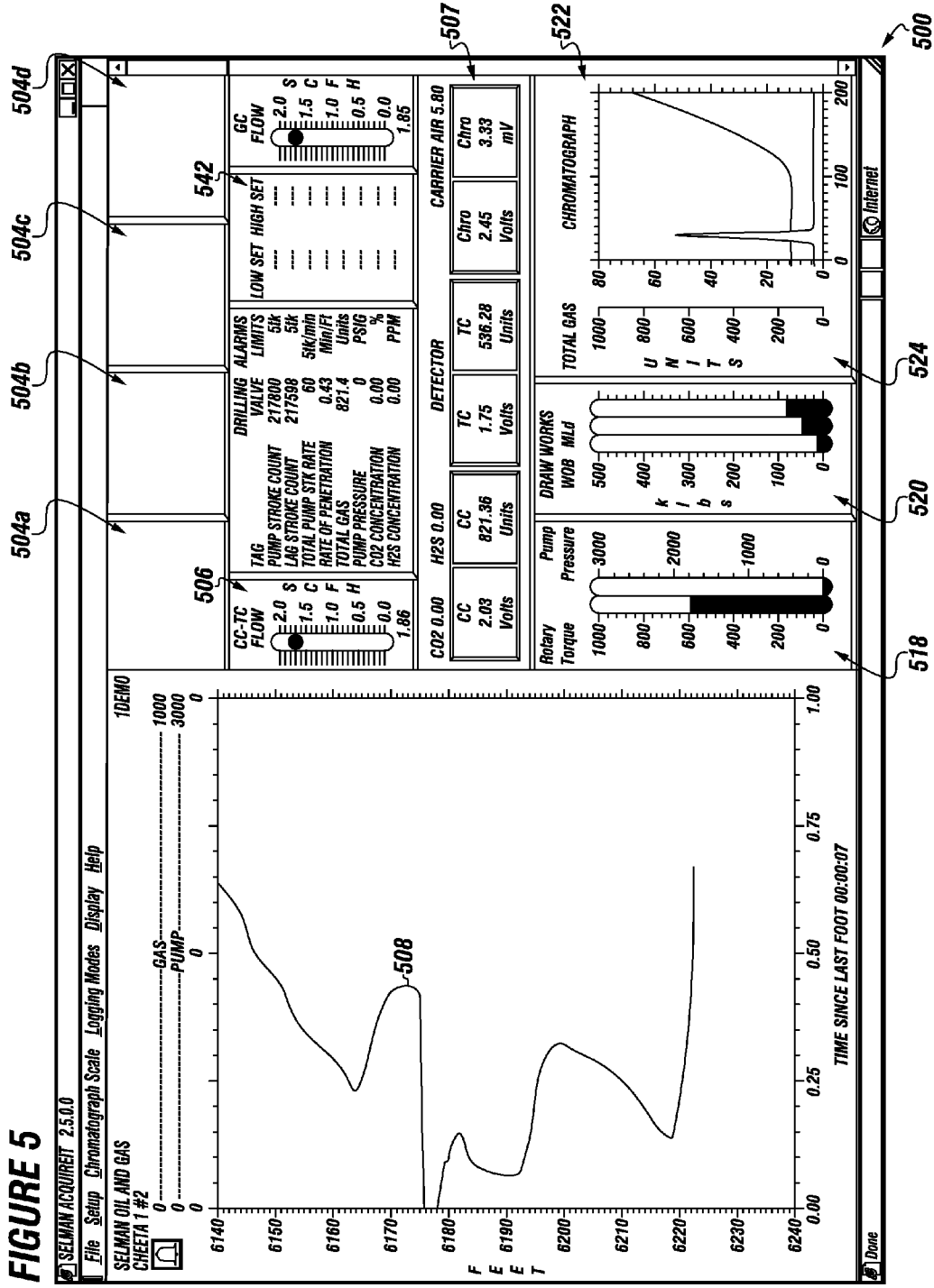
FIG. 5 is a segment of an executive dashboard.

FIG. 5 depicts a segment of an executive dashboard 500 that can be viewed by operators, executives, and the like.

The executive dashboard 500 can include a graphical representation of drilling data 508, a representation of calibrated drilling data related to flow rates 506, an acquired drilling data section 507, a calibrated pump data section 518, a calibrated draw works section 520, a graphical representation of chromatograph data 522, an alarm set section 542, and an acquired chromatograph data section 524. The acquired chromatograph data section 524 can display important voltage parameters for a chromatograph monitoring device acquiring the drilling data.

The executive dashboard 500 can also include operator data track sections 504a, 504b, 504c, and 504d. The operator data track sections 504a, 504b, 504c, and 504d can display calibrated drilling data associated with one or more drilling operations. For example, the operator data track sections 504a, 504b, 504c, and 504d can display hydrocarbon data, pump data, or other drilling data.

The alarm set section 542 can include a section for an operator to input or select alarm criteria. For example, the operator can set a low value alarm point, a high value alarm point, or both. As such, if drilling data reaches one of the alarm points, an alarm can be issued.

FIG. 6 depicts a display of a well log 850 that can be presented on a remote client device as live stream data. The remote client device can display various drilling data, calibrated data, or combinations thereof for one or more drilling operations in a real-time stream. The drilling data can be displayed using a plurality of digital data displays 810. The plurality of digital displays 810 can include a current data display area 812 showing a currently measured data point, a units section 830 showing the unit associated with the currently measured data point, and a name section 820. The name section 820 can identify the property associated with the drilling data related to the currently measured data point.

The remote client device can include various portions of the drilling data disclosed herein, such as hole depth, bit depth, lag depth, total gas, methane, ethane, propane, iso-butane, nor-butane, drill rate, hook load, pump pressure, pump stroke rate, lag strokes, torque, carrier pressure, vendor name or number, temperature, flow rate, fuel level, a wellbore identification number to identify the wellbore being monitored, and the like.

While these embodiments have been described with emphasis on the embodiments, it should be understood that within the scope of the appended claims, the embodiments might be practiced other than as specifically described herein.

What is claimed is:

1. A well logging and drilling data transmission cloud computing system for real-time streaming of drilling data including associated well logging data from a drilling rig using self-aligning satellites, the cloud computing system comprising:
    a. a computing cloud comprising one or more cloud servers each having a processor and a data storage, wherein the computing cloud further comprises additional processors and data storage, wherein the computing cloud is configured to provide at least one service and shared hardware and software resources;
    b. a plurality of rig based client devices for connecting to the computing cloud and for transmitting and receiving the drilling data and the associated well logging data, wherein each rig based client device is connected to a power supply, and wherein each rig based client device comprises:
        (i) an Internet connection;
        (ii) a well site information transfer specification "WITS" connection;
        (iii) a Voice over Internet Protocol phone connection;
        (iv) a WI-FI™ connection, wherein each rig based client device is adapted to: receive and transmit the drilling data and the associated well logging data, send and receive phone calls, send and receive queries over the Internet, send and receive communications using the WI-FI™ connection, or combinations thereof; or
        (v) combinations thereof;
    c. a plurality of rig based radio boxes disposed around the drilling rig for communicating with the computing cloud, forming a rig based local area network for connecting with the plurality of rig based client devices;
    d. a rig based router and switch connected to the rig based local area network and to a second power supply, wherein the rig based router and switch is configured to receive and transmit signals from the rig based local area network;
    e. a rig based WITS processor in communication with a WITS data storage for connecting to the computing cloud and a second power supply, wherein the rig based WITS processor is configured to: receive the drilling data from the plurality of rig based client devices, and form well logging data for transmission to the plurality of rig based client devices and to the rig based router and switch, and wherein the WITS data storage comprises:
        (i) computer instructions to receive, store, and send the drilling data and the associated well logging data;
        (ii) computer instructions to store configurations and settings for the plurality of rig based client devices, the rig based WITS processor, the rig based router and switch, or combinations thereof;
        (iii) computer instructions to perform diagnostics on the plurality of rig based client devices using diagnostic tools;
        (iv) computer instructions to online configure and reconfigure the rig based WITS processor, the rig based router and switch, the rig based client devices, or combinations thereof while the rig based local area network is operating and without shutting the rig based local area network down; and
        (v) computer instructions to perform diagnostics on the rig based local area network;
    f. a rig based satellite modem in communication with the rig based WITS processor, the rig based router and switch, the second power supply, the at least one self-aligning satellite dish, and a satellite network for connecting to the computing cloud, wherein the satellite network is in communication with a remote network operations center;
    g. a plurality computer instructions in one or more of the data storages in the computing cloud, wherein the plurality of computer instructions comprises:
        (i) computer instructions to receive the well logging data and the drilling data from the rig based WITS processor, and to store and display the well logging data and the drilling data using real-time streaming;
        (ii) computer instructions to activate an alarm when the drilling data exceeds or falls beneath a preset limit;
        (iii) computer instructions to form an executive dashboard of the drilling data and the associated well logging data;
        (iv) computer instructions to track drilling progress on multiple wells simultaneously;
        (v) computer instructions for scaling of the drilling data;
        (vi) computer instructions for transferring the drilling data to remote client devices;

(vii) computer instructions to generate a well log using the drilling data;

(viii) computer instructions to perform diagnostics on drilling rig based equipment and drilling rig based software; and (ix) computer instructions to reconfigure the drilling rig based equipment and the drilling rig software on-line without taking down or shutting off all or a portion of the rig based local area network;

h. an encrypted connection providing a secure connection between the remote network operations center and the computing cloud; and i. at least one remote client device in communication with the computing cloud.

2. The cloud computing system of claim 1, wherein the satellite network, the rig based local area network, or both are a combination of at least two networks.

3. The cloud computing system of claim 1, wherein the satellite network, the rig based local area network, or both are a satellite network, the Internet, a cellular network, a fiber optic network, another wired network, a category 5*e* network, another wireless network, a WI-FI™ network, or combinations thereof.

4. The cloud computing system of claim 1, further comprising an encryption module in the cloud computing data storage to provide an encrypted communication between the remote network operations center and the computing cloud, and to provide secure communications to and from a client device or to and from one of the plurality of rig based client devices.

5. The cloud computing system of claim 4, wherein the encryption module comprises:

a. computer instructions to form a secure log-in;

b. computer instructions to verify the secure log-in; and c. computer instructions to provide a security certificate verifiable by a trusted third party.

6. The cloud computing system of claim 5, further comprising computer instructions in the encryption module to encrypt the drilling data with a symmetric data encryption algorithm.

7. The cloud computing system of claim 1, wherein each power supply is a plurality of batteries, a bank of batteries, a wind generator, a solar array, a rig generated power supply, or combinations thereof.

8. The cloud computing system of claim 1, wherein the cloud computing server further comprises a plurality of processors connected in parallel to: a switch, the cloud computing data storage, and a third power supply.

9. The cloud computing system of claim 8, wherein the plurality of computing cloud processors connected in parallel are configured to:

a. use a central polling drop point to pick up other drilling data from other manned logging units on the satellite network; and b. record, store, and post the drilling data and the other drilling data to a website presented by the cloud computing server to the network, wherein the other drilling data is provided from the other manned logging units.

10. The cloud computing system of claim 1, wherein the plurality of rig based client devices are in communication with sensors, monitoring devices, measurement instruments, or combinations thereof, and wherein the plurality of rig based client devices receive the drilling data from the sensors, monitoring devices, measurement instruments, or combinations thereof.

11. The cloud computing system of claim 10, wherein the sensors, monitoring devices, and measurement instruments comprise: chromatographs, mud pumps, mud volume totalizes, mud pit volume tantalizers, mud pit monitors, drill switches, gas sensors, depth sensors, on-off bottom switches, flame ionization detectors, catalytic combustion detectors, thermal conductivity detectors, infrared gas detectors, other gas detection devices, other gas measuring devices, weight on bit transducers, drill rig servers, or combinations thereof.

12. The cloud computing system of claim 1, wherein the drilling data comprises: hole depth, drill bit depth, lag depth, total gas, methane content, ethane content, propane content, isobutene content, pump pressure, torque, carrier pressure, casing pressure, fluorescence, drilling mud content, well bore depths, chromatograms, lag time information, rate of penetration into the wellbore, weight on the drill bit, hook load, stand pipe pressure, pump stroke rate, rotary table speed, mud tank levels, measured depth of the wellbore, true vertical depth of the wellbore, measured depth of the drill bit, true vertical depth of the drill bit, measured depth at which the drilling data is received such as a depth of a geological or gas sample, gamma ray reading data, resistivity readings, caliber readings, temperature readings, any other data measured during the drilling of a wellbore, other related drilling information, or combinations thereof.

13. The cloud computing system of claim 1, wherein the executive dashboard comprises a presentation of data including: the drilling data, the associated well logging data, a name of the wellbore, a time stamp for the drilling data, a view time for the drilling data, WITS information, weather conditions, sea conditions, operator comments, wellbore identification data, vessel motion and mooring status data, pump strokes per minute, composition of gasses coming from the wellbore, type of rock in a formation, or combinations thereof.

14. The cloud computing system of claim 13, wherein the executive dashboard presents the data graphically, digitally, or combinations thereof.

15. The cloud computing system of claim 1, wherein the encrypted connection includes symmetric encryption, asymmetric encryption, RSA encryption, or combinations thereof.

16. The cloud computing system of claim 1, wherein each client device is configured to receive the drilling data from the cloud computing server in a real-time stream.

17. The cloud computing system of claim 1, wherein the rig based WITS processor is configured to compile the drilling data, and to track changes in the drilling data.

18. The cloud computing system of claim 17, wherein the rig based WITS processor is configured to form the well logging data by forming a table of the compiled drilling data indexed by measured hole depth, date stamp, and time stamp.

\* \* \* \* \*